April 28, 1931.  J. L. MAHAN  1,803,027

ANTISKID CHAIN

Filed April 28, 1930

Inventor

John L. Mahan,

By Clarence A. O'Brien
Attorney

Patented Apr. 28, 1931

1,803,027

UNITED STATES PATENT OFFICE

JOHN L. MAHAN, OF GRANTSBURG, ILLINOIS

ANTISKID CHAIN

Application filed April 28, 1930. Serial No. 448,008.

This invention relates to anti-skid chains for pneumatic tires, and the primary object of this invention is to provide an anti-skid chain, the invention consisting broadly in the provision of an anti-skid chain comprising a pair of circular side chains, an intermediate circular chain, together with cross chains extending laterally from said intermediate chain at spaced longitudinal points thereon, and connected with the circular side chains, the said longitudinal chains, each at one end thereof being provided with suitable fasteners for securing the ends of the respective chains together, thus providing an armor, the several parts of which may be readily assembled or disassembled so that should one of the chains completing the armor become broken, a second chain may be readily substituted therefor.

A still further object of the invention is to provide an anti-skid chain of the character above mentioned, which will afford suitable traction to the pneumatic tire, prevent skidding on turns in inclement weather, and otherwise prove fully capable of fulfilling the purposes of chains of this character.

Other objects and advantages of the invention will become apparent during a study of the following description, taken in connection with the accompanying drawings, wherein:—

Figure 1:
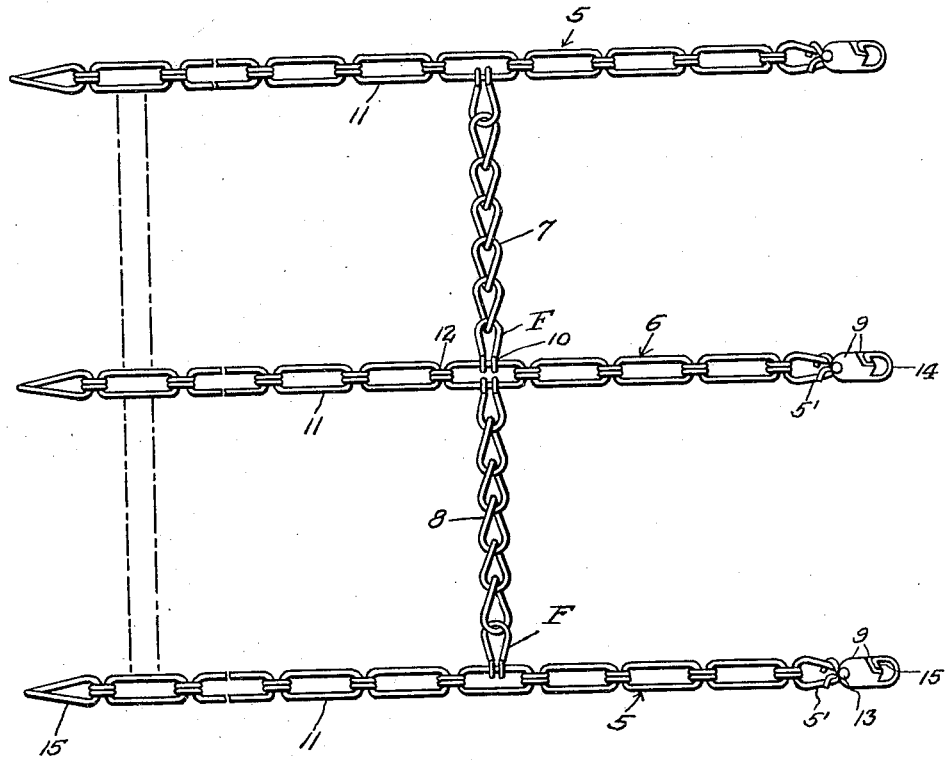
Figure 1 is a top plan view of an anti-skid chain embodying the features of the present invention.
Figure 2:
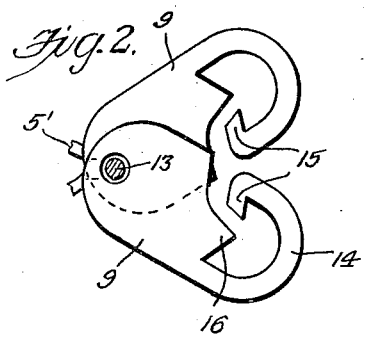
Figure 2 is a plan view of one of the fastening elements for securing the ends of the longitudinal chains together, the fastener being shown in open position.

With reference more in detail to the drawing, it will be seen that my improved antiskid chain comprises a pair of side chains 5—5 and an intermediate chain 6. Preferably, the link structure of the chains 5 and 6 is such as disclosed.

Extending laterally from the opposite sides of the intermediate chain 6, at spaced longitudinal points thereon, are the cross chains 7 and 8, respectively.

Each of the cross chains 7 and 8 comprise lengths having a quarter twist as clearly suggested in Figure 1, and at each end thereof the cross chains 7 and 8 are provided with a particular type of link F for securing the ends of the cross chains to the side and intermediate longitudinal chains. The links F of said cross chains are of that construction suggested in Figure 1, that is, having looped portion engaging a link of the respective cross chains, the loop part of the link F being passed through the end quarter twist link of the side chain, and the link being substantially U-shaped the co-extensive legs thereof terminate in aligned eyes or hooks 10 adapted to receive one portion of the looped portion of a link 11 of the longitudinal chain as clearly suggested in Figure 4.

Figure 4:
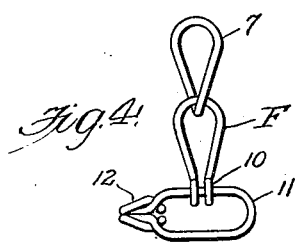
Figure 4 is a fragmentary detail plan view showing the means of securing one end of the cross chains to a link of one of the longitudinal chains.

The side and intermediate longitudinal chains 5 and 6 are identical in construction, the links forming the chains being of a structure best shown to advantage in Figure 4. As shown in Figure 4 the links 11 of which said intermediate and longitudinal chains are formed, are formed of a single length of metal or other suitable material bent so as to provide an elongated loop and then twisted at one end of the loop to provide aligned eyes 12. In assembling the links 11 to form a chain, it will be seen that that end of the links remote from the eyes 12 is passed through the eyes 12 of the next adjacent links to the chain as clearly suggested in Figure 1.

Furthermore, it will be noted that each of the chains 5 and 6 at one end thereof have their end links 5′ twisted a quarter turn so as to bring the eyes 12 in a somewhat vertical alignment for supporting therein a suitable pivot pin 13. The purpose of this feature will be hereinafter made manifest.

At the opposite end, each of the chains 5 and 6 is provided with an end link 15 which end link 15 is similar in construction to the links forming the chains 7 and 8, being of endless loop-like construction and then turned a quarter twist.

The link 5' of the respective chains 5 and 6 have associated therewith a suitable fastener or coupling member engageable with the end link 15 on the opposite end of the chain for securing said ends together with the entire structure and disposed suitably about the pneumatic tire.

The fastener above mentioned, comprises a pair of cooperating plates 9—9 pivoted at one end to the pivot pin 13. Each of said plates, at their opposite ends merge into hooked extensions 14, the bill of the hook at the free end thereof being disposed inwardly as at 15. The edge of the plate 9 at said opposite end is of angular configuration to provide a substantially triangular extension 16, one edge of which is in parallelism to the free edge of the extension 15.

Figure 3:
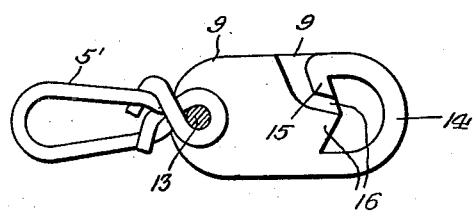
Figure 3 is a similar view showing the fastener in closed position.

As shown to advantage in Figure 3, when the fastener is in a closed position for engaging the end link 15 on the opposite end of the longitudinal chain, it will be noted that the bill of the hooks overlap one another, and that the extension 15 of one hook overlaps the V-shaped or triangular shaped extension 16 on the other plate, thus assuring a secure engagement of the clamp or fastener with the link 15.

Furthermore, as suggested in Figure 1, it will be noted that this quarter twist given to the end link 5' permits the fastener to rest somewhat flatly upon the tread of the tire so that the complemental plates of the fasteners swing on a somewhat horizontal plane.

In actual practice, the side chains 5 and intermediate chain 6 will rest on the tread of the tire, extending circumferentially of the tire and the cross chains 7 and 8 will extend transversely across the tread of the tire, as is apparent.

It is thought that from the foregoing description, taken in connection with the accompanying drawings, a clear understanding of the operation, construction, utility and advantages of an anti-skid chain of this character will be had by those skilled in the art without a more detailed description.

Even though I have herein shown and described the preferred embodiment of my invention, it is to be understood that the same is susceptible to changes fully comprehended by the spirit of the invention herein described, and the scope of the appended claims.

Having thus described my invention, what I wish to claim is:—

1. A fastener comprising a pair of complemental members pivoted at one end and at their free ends provided with hooks movable upon each other in parallel planes, and having at the free ends of the hooks inwardly directed terminals, each of said members opposite the terminal of its hook provided with an extension co-planar with the hook terminal and terminating in spaced relation to the said hook terminal, and said extensions being movable upon each other in parallel planes for closing the space between each extension and the hook terminal opposite thereto when the fastener is closed.

2. A fastener comprising a pair of complemental hook members each of which is provided with an extension in the plane of the hook and terminating in spaced relation to the free end of the bill of the hook, said hook members being movable upon each other in parallel planes with the extension of one hook member closing the space between the extension and free end of the bill of the other hook member when the fastener is closed.

In testimony whereof I affix my signature.

JOHN L. MAHAN.